United States Patent [19]

Woodman

[11] 4,277,537

[45] Jul. 7, 1981

[54] PAINT COMPOSITION FOR THE SPECTRALLY SELECTIVE COATING OF METAL SURFACES, METHOD OF PRODUCING COATINGS THEREWITH AND AN ARTICLE PRODUCED THEREBY

[76] Inventor: Trevor P. Woodman, Im Breiteli 16, 8117 Fällanden, Switzerland

[21] Appl. No.: 3,127

[22] Filed: Jan. 12, 1979

[30] Foreign Application Priority Data

Feb. 18, 1978 [CH] Switzerland ............... 1734/78

[51] Int. Cl.$^3$ .................................... C08K 3/20
[52] U.S. Cl. ....................... 428/409; 106/287.18; 106/308 Q; 252/70; 252/74; 427/224; 427/226; 428/411; 428/469
[58] Field of Search ............. 106/287.18, 308 Q; 428/469, 409, 411, 539; 148/612; 126/270; 252/70, 74; 427/224, 226

[56] References Cited

U.S. PATENT DOCUMENTS

| | | | |
|---|---|---|---|
| 2,316,535 | 4/1943 | Böhner | 106/308 Q |
| 3,978,272 | 8/1976 | Donley | 428/469 |
| 4,034,129 | 7/1977 | Kittle | 428/469 |
| 4,098,956 | 7/1978 | Blickenderfer et al. | 428/469 |
| 4,150,191 | 4/1979 | Karki | 428/469 |
| 4,153,753 | 5/1979 | Woodman et al. | 428/409 |

OTHER PUBLICATIONS

Moore et al., *Sharing the Sun, Solar Technology in the Seventies,* Joint Conference USISES/Solar Energy Soc. Canada, Aug. 15-20, 1976, Winnipeg, pp. 187-204.

*Primary Examiner*—Allan Lieberman
*Attorney, Agent, or Firm*—Werner W. Kleeman

[57] ABSTRACT

The invention comprises a paint composition for the spectrally selective coating of metal surfaces, a method of producing the coatings and an article for the absorption of radiant energy employing the paint coatings. Selected metal oxide pigments in powder form are mixed with a suitable binder to form the paint, which is applied to clean metal surfaces by conventional means to form a selective absorption composite with an absorptance to emittance ratio of at least 2.5.

14 Claims, 4 Drawing Figures

PAINT COMPOSITION FOR THE SPECTRALLY SELECTIVE COATING OF METAL SURFACES, METHOD OF PRODUCING COATINGS THEREWITH AND AN ARTICLE PRODUCED THEREBY

BACKGROUND OF THE INVENTION

1. Field of the Invention

The present invention relates to relatively low cost optical coatings which are formed by applying a paint or paint composition to metal surfaces to give these surfaces spectrally selective properties. A major application of such selective surfaces is for the efficient collection of radiant energy at wavelengths which are effectively absorbed by the surfaces, and more particularly as absorber surfaces in solar thermal energy collectors in order to improve the cost effectiveness of such devices.

2. Description of the Prior Art

A metal surface which has been coated with an optical absorption layer is described as being spectrally selective if the absorptance, $\alpha$, of the coated surface for radiation of a certain range of wavelengths is greater than the emittance, $\epsilon$, of the same surface for radiation of a different range of wavelengths. The ratio $\alpha/\epsilon$ is generally termed the selectivity of the surface; in this disclosure the terms medium selectivity and medium selective refer to $\alpha/\epsilon$ ratios in the range of about 2.5 to about 5; the terms high selectivity and highly selective refer to ratios $\alpha/\epsilon$ which are greater than about 5.

It is immediately apparent that the use of medium and highly selective surfaces in radiant energy collectors can significantly influence the efficiency of heat generation, since the absorptance for the radiation to be collected can be kept high while at the same time the heat radiation losses can be kept low. In the particular case of a solar thermal energy collector, a normal black surface may be used to absorb solar radiation efficiently, i.e., at wavelengths in the range of 0.3 to 2.5 $\mu$m, approximately; however, a normal black surface, being nearly an ideal black body with a selectivity of about unity, reradiates heat energy very strongly at longer wavelengths, for example, above 2.5 $\mu$m at surface temperatures in the order of 100° C. On the other hand, a spectrally selective surface can be made to absorb solar radiation effectively, while reradiating much less heat energy than a normal black surface. Thus the useful heat output can be significantly increased in relation to the solar energy input, i.e., the efficiency is greater.

Various absorption coatings are known in the art which give a high selectivity to suitable metal surfaces. Such coatings are produced by wet chemical or electrochemical processes or by evaporation in vacuum or by deposition from the gas phase onto metallic substrates. In certain cases a selectivity of greater than 9 is attained. All of these coatings, however, are relatively costly because of the high investment and running costs of the necessary coating plant, so that their use in radiant energy collectors is generally not cost effective.

However, it has been shown by applicant in *Solar Energy, Vol.* 19, p. 263-270 (1977) that even medium selective absorber coatings can considerably increase the efficiency of radiant energy collectors, in particular flat plate solar thermal energy collectors.

In the literature paint-like coatings are described which comprise mixtures of germanium, silicon, lead sulfide, soot or black iron oxide as powder pigments with silicone resin as binder. Of these coatings, only those reported by Moore et al, *Sharing the Sun, Solar Technology in the Seventies,* Joint Conference USISES/Solar Energy Soc. Canada, Aug. 15-20, 1976, Winnipeg, pp. 187-204, have achieved medium selectivity. However, these coatings are stated to require a curing period of 12 hours at elevated temperature (see p. 189), a fact which rules out an economical coating of metals on a production line by this method. A further disadvantage of the coatings of Moore et al is that black iron oxide, the pigment used by them, changes to a reddish product upon heating above about 300° C., thus losing its high optical absorptance. Hence, radiant thermal energy collectors using such coatings are limited to working temperatures in the range up to about 200° C., allowing for a safety margin.

SUMMARY OF THE INVENTION

It is therefore an object of this invention to provide a selective absorbing surface of at least medium selectivity by a method which is rapid, simple, and inexpensive, not requiring costly coating plant.

Another important object is to provide a novel paint composition for the spectrally selective coating of metal surfaces to impart thereto at least medium selectivity.

The present invention provides a paint-like selective absorption coating of at least medium selectivity by a method which is rapid, simple and inexpensive, whereby the conditioning of the coating after application, i.e., drying, hardening or curing, etc., is accomplished in a short period of time. Certain embodiments of the present invention are additionally capable of withstanding working temperatures of up to about 600° C., in contrast to the prior art.

A spectrally selective surface of at least medium selectivity is produced by cleaning the metal surface of a substrate and applying and conditioning a thin layer of a paint, wherein the pigment comprises at least one metal oxide in powder form having a good transparency for heat radiation, and the binder is chosen such that after conditioning of the paint layer, the pigment adheres to the metal surface, any residue of the binder which may remain in the paint layer after conditioning being highly transparent to heat radiation.

Pigments useful in the practice of the present invention include the oxides of chromium, cobalt, iron and copper. Binders chosen for use in the practice of the present invention must be capable of forming a paint with the pigment, such that the paint may be applied in a thin layer onto a metal surface, either directly or after thinning, by conventional painting techniques, and must be further capable of undergoing physical or chemical change upon conditioning the applied paint layer, such that a dry, adherent layer having the required selective properties results. Binders useful in the practice of the present invention include liquids which can be caused to evaporate after application of the paint, and liquids which can be caused to decompose after application of the paint, the decomposition products then evaporating.

BRIEF DESCRIPTION OF THE DRAWINGS

The invention will be better understood and objects other than those set forth above, will become apparent when consideration is given to the following detailed description thereof. Such description makes reference to the annexed drawings wherein.

DESCRIPTION OF THE PREFERRED EMBODIMENTS

Figure 1:
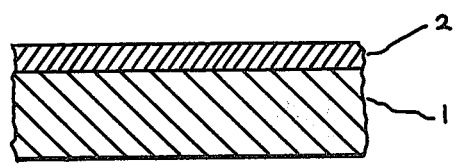
FIG. 1 is a cross-sectional view, not to scale, of an embodiment of the present invention, wherein the paint layer has been applied onto a metal substrate, the conditioned layer forming together with the adjacent metal surface an optically absorbing composite of at least medium selectivity.

The paint according to the present invention is made by mixing and grinding at least one metal oxide pigment in powder form together with a binder satisfying the general requirements set forth heretofore. The binder may comprise a liquid, a mixture of liquids, or a solution of at least one solid in a liquid or mixture of liquids.

A group of binders useful in the practice of the present invention comprises liquids which will form a suspension or slurry with the pigment and which can be made to evaporate completely after application to the metal surface, where necessary by the application of heat. Liquids useful in this respect include volatile organic solvents, for example, acetone, xylene, methanol, ethanol, isopropanol and n-propanol, but it is postulated that any liquid may be employed which can be caused to evaporate as described herein. The preferred binders of this group have a sufficiently high viscosity to prevent rapid sedimentation of the pigment, thus facilitating the formation of a coating of even thickness, for example, mixtures of tertiary butanol with isopropanol or with n-propanol.

Another group of binders useful in the practice of this invention comprises relatively high viscosity liquids which will form a paint with the pigment, and which can be made to decompose after application of the paint, the decomposition products then evaporating. Liquids useful in this respect include those polyhydric alcohols which decompose and evaporate below about 200° C. or solutions thereof, for example, glycerol or an aqueous solution of sorbitol, but it is postulated that any liquid may be employed which can be caused to decompose and evaporate as described herein.

In many cases it has been found that the pigment adheres more strongly to the substrate after the coated substrate has been heated briefly at about 180° C. or above. Heating may be accomplished in a furnace, by gas flame, by radiation, by passing a hot fluid through channels in the substrate, or by any other convenient means.

A most preferred binder is glycerol, which is non-toxic, is readily available at relatively low cost and in high purity from the chemical industry, and has a viscosity well suited to the manufacture of the paint and to its application in a thin layer to metal surfaces. The preferred purity of glycerol is 98% pure. Where necessary, the glycerol-based paint may be thinned with water or an alcohol, substances which are non-toxic or only slightly toxic, and therefore relatively harmless to the environment. It is pointed out that environmental compatibility is an important advantage of the present invention and contributes to the relatively low cost of selective surfaces according to this invention. The preferred method of conditioning the glycerol-based paint coating is by heating to at least 180° C. (substrate temperature).

Metal oxide pigments useful in the practice of this invention include the oxides of chromium, cobalt, iron, and copper. The preferred oxides are chromic oxide ($Cr_2O_3$), cobalto-cobaltic oxide ($Co_3O_4$), ferrosoferric oxide ($Fe_3O_4$), and cupric oxide (CuO). The most preferred black pigment is cobalto-cobaltic oxide. Preferred colored pigments are chromic oxide (green) and cupric oxide (brown). A preferred pigment mixture for a dark green paint consists of cobalto-cobaltic oxide and chromic oxide mixed in a ratio of from about 1 to 1 to about 1 to 3 by weight, most preferably in a ratio of about 1 to 3 by weight. The preferred mixture ratio of pigment to glycerol is between about 1 to 2 and about 5 to 1 by weight. The preferred mixture ratio of cobalto-cobaltic oxide to 98% pure glycerol is about 1 to 1 by weight.

The paint is preferably prepared in a commercially available grinder-mixer. To facilitate the process, the viscosity of the pigment-binder premixture may be lowered, if necessary, by the addition of a suitable thinner of a type conventionally used for this purpose. If the paint is to be applied to metal surfaces with the use of a thinner, then the same thinner should preferably be used, if necessary, in the grinding-mixing process. Thinners useful in connection with the glycerol-based paint are water and alcohols. The preferred alcohols are isopropanol and n-propanol.

It should be emphasised that the paint according to this invention is by no means limited to use on a particular metal or group of metals, in contrast to chemical and electrochemical methods of producing selective surfaces in the prior art. A person skilled in the art of designing radiant thermal energy collectors, for example, will select a metal for the fabrication of absorber elements primarily on the basis of such criteria as availability, cost, durability, thermal conductivity, weight, ease of fabrication, suitability for the envisaged operating conditions, etc. On this basis the metal substrate used to support the paint of this invention might be chosen from such materials as copper, copper alloys, aluminum, aluminum alloys, steel, stainless steel, or steel plated or coated with zinc, copper, aluminum, nickel, tin, etc. However, the choice of such metals for a specific application should in no way be construed as limiting the present invention to the use of such metals. In another application of this invention quite different metals, for example, gold or platinum, may be the preferred choice. In yet another application it may be desired to employ a non-metallic substrate, such as glass or plastics suitable for forming solar absorbers, such as polyethylene and polypropylene by way of example, which is plated with a metal before applying the paint according to this invention, in which case a metal will be chosen which can be plated easily onto the substrate. Even metals which are liquids under the conditions of use, or which are highly reactive in the presence of air, for example, should not be excluded from the practice of the present invention, since future technologies requiring spectrally selective surfaces may demand the use of such metals, where necessary in vacuum or under a protective atmosphere. Thus, although certain metals have been mentioned in this disclosure, nevertheless, the invention may be practiced with a much greater number of metals as the need arises.

The paint according to this invention may be applied to metal surfaces by any method which results in a thin, relatively even layer with a thickness in the region of a few micrometers. The actual thickness to be used depends on the choice of pigment, binder, the mixing ratio, the $\alpha$- and $\epsilon$- values of the metal surface, and those $\alpha$- and $\epsilon$- values desired for the selective surface. Methods of application useful in the practice of this invention include brushing, spraying, dipping, flooding, rolling, or silk screening.

Before applying the paint, the metal surface must be cleaned of grease, oxides and other contaminants which would raise the emittance of the surface. The normal atmospheric oxide layer on most metals is not usually thick enough to affect the emittance significantly. The surface should be treated, such that the paint spreads evenly over the surface and does not form islands. To this end, the surface may be slightly roughened, but the roughness should not exceed about 1 to 2 $\mu$m, in order to avoid raising the emittance. According to the metal, binder and thinner used, it may suffice to degrease the surface, or it may be necessary to further brush or scrub the surface, for example, with steel wool, soap and water, or to use an appropriate etchant, or a combination of brushing and etching. Lightly etched surfaces are preferred on account of their lower emittance and good wetability.

Figure 2:
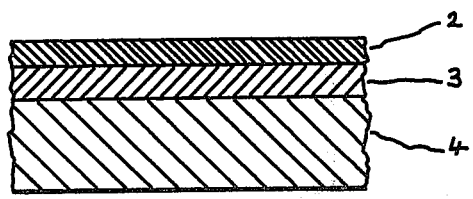
FIG. 2 is a cross-sectional view, not to scale, of another embodiment of this invention, wherein a metal or non-metal substrate has first been plated with a metal layer before applying the paint layer, the conditioned layer forming together with the adjacent metal surface of the metal layer an optically absorbing composite of at least medium selectivity.

Now in FIG. 1 there is shown a cross-sectional view, not to scale, of an embodiment of this invention, wherein the paint layer 2 has been applied onto a metal substrate 1. FIG. 2 shows another embodiment of the invention in cross-section, not to scale, wherein a metal or non-metal substrate 4 has been first plated with a metal layer 3 before applying the paint layer 2.

The coated substrates are analyzed with a Zeiss Model M4QIII Spectrophotometer with Reflectance Attachment Model RA3 which measures the spectral reflectance of the samples at wavelengths of from 0.4 to 2.5 $\mu$m. Following common practice, the reflectance is weighted over a solar AM2 (air mass two) spectrum, but the weighting can equally well be performed over the spectrum of some other radiant source. The absorptance is calculated by subtracting the weighted reflectance from unity. The coated substrates, cut to about 80 mm square, are heated to 70° C. and the emitted heat radiation measured by an infrared pyranometer placed 15 mm from the center of the samples. The emittance is calculated by comparison with the heat emission from reference plates coated with gold ($\epsilon = 3\%$) and with a thick black dispersion paint ($\epsilon = 98\%$) which are maintained at the same temperature.

The invention may be further appreciated from the description of specific examples which follow.

EXAMPLE 1

A coarse mixture of 300 grams cobalto-cobaltic oxide with 300 grams 98% pure glycerol and 50 grams isopropanol is prepared. The mixture is then passed three times through a grinder-mixer Model Homozenta (Karu AG, Zumikon, Switzerland), adjusted to the finest grinding position.

A 300 mm square, 2 mm thick commercially pure aluminum sheet is scrubbed with steel wool, soap and water to degrease and roughen the surface, rinsed with water and dried with a cloth. The paint mixture is thinned with isopropanol to a DIN cup viscosity of about 13 seconds and applied to the prepared metal sheet in a thin, uniform layer by means of a spray gun. The weight of the wet paint layer is about 9 grams per square meter.

The coated sheet is heated in a gas flame, maintained at about 200° C. for about 10 seconds to condition the layer and then cooled in the air. The coating is matte black in appearance. A 80 mm square sample is cut from the coated sheet and used for optical measurements. The coated sample has a solar AM2 absorptance of 91% and an emittance of 30%; the selectivity is therefore 3.0.

The sample was subsequently heated in the gas flame to about 600° C. and cooled. The optical values, adherence and abrasion resistance of the coating were unchanged.

EXAMPLE 2

A paint comprising 60 grams cobalto-cobaltic oxide, 180 grams chromic oxide, 180 grams 98% pure glycerol and 10 grams isopropanol is prepared by the method described in Example 1. A 80 mm square copper sheet, 0.5 mm thick, is prepared as in Example 1 and coated with the paint, using a rubber roller. The wet paint layer weighs about 9 grams per square meter. After heating and cooling as in Example 1 the coating is matte dark green in appearance and the selectivity is about 2.5 (85% solar AM2 absorptance and 34% emittance).

EXAMPLE 3

A stainless steel sheet 80 mm square and 0.5 mm thick is degreased, abraded with steel wool wettened with an aqueous solution of 10% HCl and 2% H$_3$PO$_4$, rinsed and dried. The thinned paint composition of Example 1 is sprayed evenly over the prepared surface so as to just hide the metallic lustre of the surface. The coated sample is heated in a gas flame, held at about 180° C. for about 30 seconds and cooled in the air. The coating is matte black in appearance. The coated sample has a solar AM2 absorptance of 92% and an emittance of 35%; the selectivity is therefore 2.6.

EXAMPLE 4

A tinned steel sheet (tinplate) 80 mm square and 0.3 mm thick is degreased in acetone, and then spray-coated and conditioned as in Example 3. The coating is matte black in appearance. The coated sample has a solar AM2 absorptance of 93% and an emittance of 37%; the selectivity is therefore 2.5.

EXAMPLE 5

A zinc-coated steel sheet 80 mm square and 0.5 mm thick is degreased, abraded with steel wool wettened with 5% aqueous HCl, rinsed and dried. The prepared surface is spray-coated and conditioned as in Example 3. The coating is matte black in appearance. The coated sample has a solar AM2 absorptance of 93% and an emissivity of 36%; the selectivity is therefore 2.6.

EXAMPLE 6

A paint is prepared by mixing 50 grams of finely powdered cupric oxide with 50 grams of 98% pure glycerol and 5 grams of isopropanol. A copper sheet 80 mm square and 0.5 mm thick is degreased, abraded with steel wool wettened with 5% aqueous HCl, rinsed and dried. A thin layer of paint is applied to the prepared surface with a rubber roller and conditioned by heating to 180° C. A second paint layer is applied over the first in the same manner and conditioned as before. The coating is matte brown in appearance. Absorptance in the visible spectrum is about 92%, but the solar AM2 absorptance is 78%, the emittance being 19%; the selectivity is therefore 4.1.

EXAMPLE 7

A commercially pure aluminum sheet 100 mm square and 0.5 mm thick is degreased and lightly abraded with steel wool wettened with 5% aqueous NaOH, rinsed and dried. The prepared surface is spray-coated and conditioned as in Example 3. The coating is matte black in appearance. This sample was analysed by an independent laboratory using different instruments to those described previously herein. A 22 mm diameter disk was cut from the sample and the diffuse reflectivity of the coated face measured in a spectrophotometer in the 0.35 to 2.0 $\mu$m wavelength range. The solar AM2 absorptance, calculated by subtracting the weighted reflectivity from unity, was found to be 92%. The same disk was further analysed at room temperature in a Gier Dunkle Model DB-100 Infrared Reflectometer. The thermal emittance, weighted for the emission spectrum of a black body at about 50° C., was found to be 29%. The selectivity is therefore 3.2.

EXAMPLE 8

A copper sheet 100 mm square and 0.5 mm thick is degreased and abraded with steel wool wettened with 5% aqueous HCl, rinsed and dried. The prepared surface is spray-coated and conditioned as in Example 3, and the coating is matte black in appearance. This sample was analysed as in Example 7, yielding a solar AM2 absorptance of 93% and a thermal emittance of 25%; the selectivity is therefore 3.7.

EXAMPLE 9

A commercially pure aluminum sheet 420×210×0.5 mm in size was prepared, coated and conditioned according to Example 7.

An identical plate was painted with a black dispersion paint. Each plate was in turn mounted with the uncoated face in good thermal contact with an electrically heated plate mounted in a thermally insulated housing to form a flat plate collector simulation model. The test plate was in each case covered with one or two glass plates at separations of 25 and 50 mm, respectively, therefrom in the manner of a flat plate collector. The model was set up at an angle of 60° to the horizontal. Each test plate was electrically heated and the power required to maintain a steady temperature difference, $\Delta T$, between the plate and the ambient air was determined, thus giving the total heat loss rate from the model. The back and edge losses were determined by covering the test plate with a thick insulation block instead of glass. The forward heat loss rate was determined from the difference of the two measurements and plotted against $\Delta T$, as shown in FIG. 3.

Figure 3:
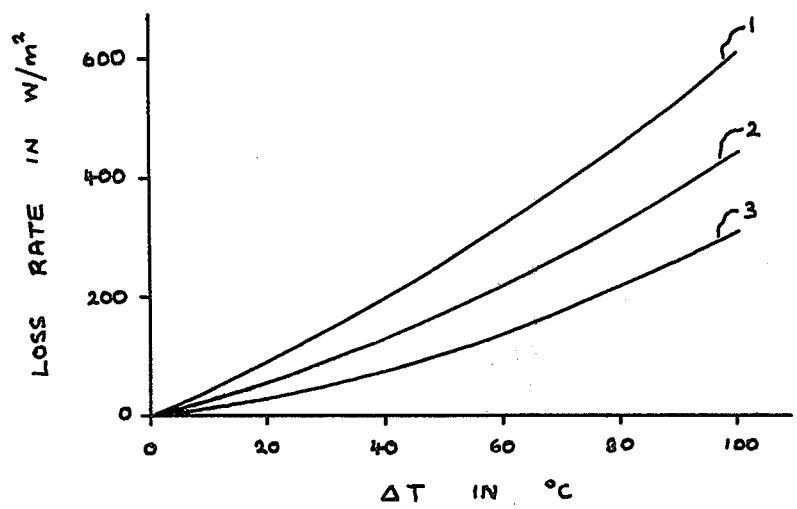
FIG. 3 shows the results of laboratory heat loss measurements from flat plate absorbers with selective and non-selective coatings, in each case with one or two glass covers, and wherein the forward loss rate is plotted against the temperature difference between absorber and ambient, $\Delta T$, in °C.

The conclusions to be drawn from FIG. 3 are firstly that there is a significant reduction of heat loss upon changing from the normal black surface to the selective surface when both are covered with one glass (change from Curve 1 to Curve 2), or both are covered with two glasses (change from Curve 2 to Curve 3); and secondly, that the heat loss for a normal black surface and two covers is the same as for the selective surface and one glass (both represented by Curve 2).

EXAMPLE 10

Figure 4:
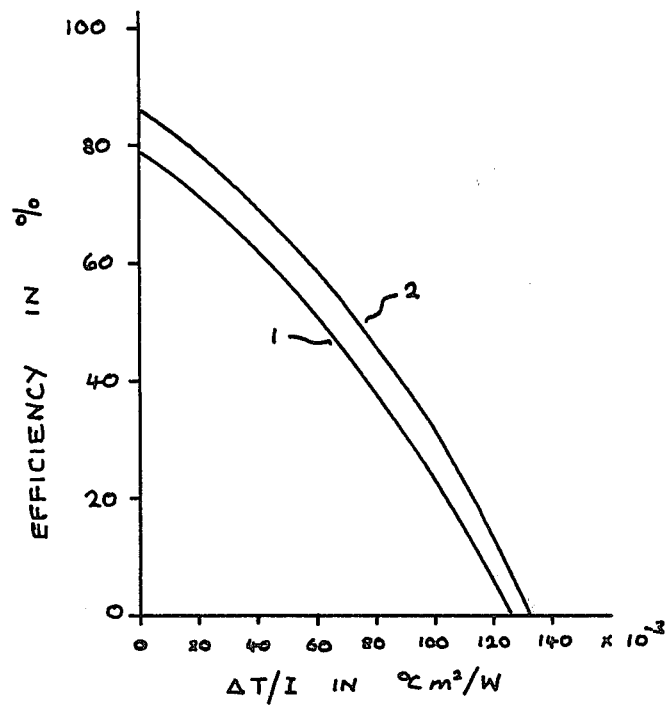
FIG. 4 shows the results of outdoor measurements of the instantaneous thermal efficiency of a solar flat plate collector with selective or non-selective absorber coatings and one or two glass covers, respectively. The efficiency is plotted against the parameter $\Delta T/I$, where I is the incident global radiation in W/m2.

The thermal efficiency of a commercially available solar flat plate collector was measured by outdoor test in sunshine, essentially in accordance with the Standard NBSIR 74-635 of the National Bureau of Standards, Washington D.C. The collector was equipped with a 1.4 m2 aluminium Roll-Bond absorber plate with a normal black paint coating and two glass covers. The results of the test are shown in Curve 1 of FIG. 4.

An identical, unpainted absorber plate was prepared, coated and conditioned as in Example 7.

The original absorber of the collector was replaced by the selectively coated absorber plate and the two covers were replaced by a single glass. The thermal efficiency was again measured according to NBSIR 74-635 and is shown in Curve 2 of FIG. 4. In both cases the heat transfer fluid was water and ambient temperatures were in the region of 20° to 25° C.

A comparison of the curves shows that the selectively coated absorber has a higher efficiency than the black painted absorber over the entire working range of temperatures and insolation rates. Since this is accomplished with a simpler construction, i.e., with only one glass cover, and the extra cost of the selective coating is not as great as the material and labor costs saved by eliminating the second cover, the use of the selective coating according to this invention obviously raises the cost-effectiveness of the collector.

While there are shown and described present preferred embodiments of the invention, it is to be distinctly understood that the invention is not limited thereto, but may be otherwise variously embodied and practiced within the scope of the following claims. Accordingly,

What I claim is:

1. A paint composition for the spectrally selective coating of metal surfaces, comprising a pigment and a binder, said pigment comprising at least one metal oxide in powder form having a good transparency for heat radiation, said binder containing glycerol and said binder undergoes a physical or chemical change upon thermal conditioning thereof, the binder after conditioning, holding the pigment in place on a metal surface, such that a layer of the paint composition, after having been applied to the metal surface and conditioned, gives such metal surface at least a medium selectivity of between about 2.5 to 5.

2. The paint composition according to claim 1, wherein the binder can be conditioned in a short period of time.

3. The paint composition as defined in claim 1 wherein the binder can be conditioned in less than one minute.

4. The paint composition as defined in claim 2, wherein the binder is thermally conditioned at temperatures above 180° C.

5. The paint composition according to claim 1, wherein the conditioned layer of the paint composition remains chemically and mechanically stable at temperatures up to about 600° C.

6. The paint composition according to claim 1, wherein the pigment comprises at least one metal oxide pigment in powder form selected from the group consisting essentially of chromic oxide ($Cr_2O_3$), cobalto-cobaltic oxide ($Co_3O_4$), ferrosoferric oxide ($Fe_3O_4$), cupric oxide (CuO) or mixtures thereof.

7. The paint composition according to claim 1, wherein the pigment is cobalto-cobaltic oxide and the cobalto-cobaltic oxide and glycerol are mixed in a ratio of between about 1:2 and 5:1 by weight.

8. The paint composition according to claim 1, wherein the pigment contains cobalto-cobaltic oxide and chromic oxide, in a ratio of between about 1:1 and 1:3 by weight and such pigment is mixed together with the glycerol binder.

9. The paint composition according to claim 1, employed for the spectrally selective coating of an absorption element of a collector of radiant energy.

10. The paint composition according to claim 9, wherein the absorption element is the absorption element of a solar energy collector.

11. A method for the fabrication of a body with a spectrally selective surface coating comprising the steps of:

providing a substrate having a metal surface which is to accept a paint composition;

coating a paint composition as an outer layer onto the metal surface of the substrate;

said paint composition comprising at least one metal oxide pigment in powder form having good transparency for heat radiation and a glycerol-containing binder which undergoes a physical or chemical change upon conditioning, holds the pigment in place on the metal surface; and thermally conditioning the applied paint layers in a short period of time to thereby impart to the metal surface at least a medium selectivity of between about 2.5 to 5.

12. A method for the fabrication of a body with a spectrally selective surface coating comprising the steps of:

providing a substrate having a metal surface which is to accept a paint composition;

coating a paint composition as an outer layer onto the metal surface of the substrate;

said paint composition comprising at least one metal oxide pigment in powder form having good transparency for heat radiation and a binder other than silicates and silicone resin which undergoes a physical or chemical change upon conditioning, holds the pigment in place on the metal surface; and thermally conditioning the applied paint layers in a short period of time at a temperature exceeding 180° C. to thereby impart to the metal surface at least a medium selectivity of between about 2.5 to 5.

13. The method according to claim 12 wherein said binder is glycerol.

14. A body with spectrally selective surface coating made in accordance with claim 11.

* * * * *